(12) United States Patent
Yi

(10) Patent No.: US 6,878,188 B2
(45) Date of Patent: Apr. 12, 2005

(54) METHOD AND APPARATUS FOR REMOVING VOCS FROM WATER

(76) Inventor: Ye Yi, 40 S. 600 East, Salt Lake City, UT (US) 84102

(*) Notice: Subject to any disclaimer, the term of this patent is extended or adjusted under 35 U.S.C. 154(b) by 182 days.

(21) Appl. No.: 10/315,677

(22) Filed: Dec. 9, 2002

(65) Prior Publication Data
US 2004/0107836 A1 Jun. 10, 2004

(51) Int. Cl.⁷ .............................................. B01D 19/00
(52) U.S. Cl. ............................. 95/245; 95/263; 96/202; 261/76
(58) Field of Search .......................... 95/245, 259, 263; 96/157, 215, 216, 202; 209/170; 261/76

(56) References Cited

U.S. PATENT DOCUMENTS

| | | |
|---|---|---|
| 4,187,088 A | 2/1980 | Hodgson |
| 4,279,743 A | 7/1981 | Miller |
| 4,397,741 A | 8/1983 | Miller |
| 4,399,027 A | 8/1983 | Miller |
| 4,608,163 A | 8/1986 | Yohe et al. |
| 4,663,089 A | 5/1987 | Lowry et al. |
| 4,744,890 A | 5/1988 | Miller et al. |
| 4,954,147 A | 9/1990 | Galgon |
| 4,997,549 A | 3/1991 | Atwood |
| 5,378,267 A | 1/1995 | Bros et al. |
| 5,458,738 A * | 10/1995 | Chamblee et al. .......... 162/190 |
| 5,529,701 A | 6/1996 | Grisham et al. |
| 5,531,904 A | 7/1996 | Grisham et al. |
| 5,662,811 A | 9/1997 | Grisham et al. |
| 5,730,875 A | 3/1998 | Grisham et al. |
| 6,136,204 A | 10/2000 | Krejci |
| 6,602,327 B2 * | 8/2003 | Morse et al. ................. 95/261 |

* cited by examiner

Primary Examiner—Robert A. Hopkins
(74) Attorney, Agent, or Firm—TraskBritt (57) ABSTRACT

A method and apparatus for removing volatile contaminants, such as methyl tertbutyl ether (MTBE), from water or other supplies of liquid. In one embodiment of the invention, a gas is sparged through a helical flow of liquid to strip away contaminants. The flowrate of the helical flow of liquid and the flowrate of the gas are held at an optimum ratio to maintain flow stability and maximize stripping efficiency. In another embodiment of the invention, the liquid is processed through a series of stripping stages until volatile contaminants are stripped to a desired level. A portion of the liquid is recycled within each stage, while a system flow of liquid passed from one stage to the next. The flowrate of the recycled flow and the flowrate of the system flow have a ratio that provides improved system capacity while ensuring proper volatile removal.

24 Claims, 5 Drawing Sheets

First Stage    Second Stage

FIG. 4

METHOD AND APPARATUS FOR REMOVING VOCS FROM WATER

BACKGROUND OF THE INVENTION

1. Field of the Invention

The present invention relates to a method and apparatus for removing volatile contaminants from liquids. More specifically, the present invention relates to removing volatile organic compounds (VOCs) such as methyl tertbutyl ether (MTBE) from water by transferring them to a supply of gas sparged through the water.

2. State of the Art

Many water sources and/or industrial waste waters contain VOCs introduced from such sources as chemical processing, petroleum production or industrial cleaning processes. Groundwater can also contain these substances due to pollution from underground tanks, surface chemical spills, migration of chemicals from waste disposal sites, etc. Environmental regulations place limitations on the amount of VOCs that may be present in water when released to the environment or when used for purposes such as irrigation or for human consumption. Accordingly, it is often necessary that a source of water must be treated to remove VOCs before it is suitable for its intended use.

The removal of VOCs from these waters has been accomplished by various methods and apparatus known in the art for many years. The stripping can be conducted by direct sparging of air through water columns or trays, packed towers, and a wide variety of other specifically designed equipment. Due to the chemical potential difference, VOCs contained in the water will transfer spontaneously into the air from air/water interface during the stripping, thus the concentration of the VOCs in the water is reduced.

One common approach for VOC removal of the "pump-and treat" category is the use of a packed tower stripper. In packed tower stripping, VOC-containing water is pumped and fed into the top of the tower and naturally flows to the bottom of the tower by passing through the packing media inside the tower. The packing media is used to increase the air/water contact as well as to increase the residence time of the water in the tower for stripping. The air is blown from the bottom of the tower and travels upward until discharged from the top of the tower. During such air/water countermotion, VOCs contained in the water are stripped from water into the air. Tower strippers of this type are shown, for example, in U.S. Pat. No. 4,608,163 to Yohe et al. and U.S. Pat. No. 5,378,267 to Bros et al.

Although widely used, the major disadvantage of the packed tower is the efficiency and the size. It basically has a low processing capacity (gallons treated per minute per cubic foot of the equipment volume). It is very common for commercial strippers to be 10 feet in diameter and 15–25 feet in height. As such, significant investment in terms of equipment and space is required. Further, dissolved metal ions such as $Fe^{+2}$ and $Ca^{+2}$ contained in the water, together with other solid particles in the water, often precipitate during the stripping, resulting in the fouling of the packing media. Frequent cleaning or replacement of the packing media is therefore needed, resulting in a high operational cost. In addition, from an engineering point of view it is very difficult and costly to scale-down the design of tower strippers to economically handle small flowrate applications. As an example, it is well know that many agricultural water wells in the state of California contain MTBE. Currently, there are no commercial packed tower strippers that are small enough, efficient enough, low cost enough and user friendly enough for farmers or ranchers to install them to remove MTBE under small flowrate situations. Further, MTBE has a high chemical affinity with the water. As such its volatile pressure is very low and stripping is very difficult. It has been reported in prior testing and experiments that the use of two packed tower strippers in series was required in order to achieve the desired stripping or removal of the MTBE. As such, equipment, operation costs and space considerations become significant.

Another approach to removing VOCs from water involves using a hydrocyclone type apparatus. In this method, a helical or swirl flow of contaminated water is generated within a cylindrical passageway and a gas is sparged through the flow to remove volatiles. U.S. Pat. No. 5,662,811, U.S. Pat. No. 5,531,904 and U.S. Pat. No. 5,529,701 to Grisham et al., for instance, disclose various apparatus embodiments of this type where a horizontal porous tube is contained within an outer jacket defining a gas plenum. Water is injected through the horizontal tube as a spiral flow along its inner surface. As the water passes through the tube, a gas is sparged through the spiral flow to strip out volatiles. After the water travels the length of the tube, it is passed into a liquid collection vessel for later use, while the volatile containing gas is separated out into one or more gas discharge assemblies.

While the hydrocyclone strippers disclosed in these patents have provided improvements over packed stripping towers, they still exhibit drawbacks in terms of operating efficiency and ability to remove volatiles. For example, because the porous tube is horizontally oriented, radial accelerations of up to 150 G are required to maintain the desired swirl flow of water along its interior. This requires high flow velocity and thereby larger pumping equipment. Furthermore, in attempting to remove volatiles in a single pass through the tube, the ratio of the sparging gas flowrate to that of the liquid has to be greater than 50 to 1. At this level the gas may disturb the spiral flow and pass through the water too rapidly to efficiently strip volatiles. What is needed is a low cost, high capacity, high efficiency, user friendly stripping apparatus that can be conveniently manufactured into different sizes to handle both voluminous streams for industrial application and small streams for agricultural or residential uses.

BRIEF SUMMARY OF THE INVENTION

The present invention reveals a method and apparatus for efficiently stripping VOCs, in particular methyl tertbutyl ether (MTBE), from water into air. The device comprises a stripping vessel that generates a helical flow of VOC-containing water along the inner surface of an upright porous tube. Preferably, the porous tube is vertically oriented. Air is introduced into the water through the wall of the porous tube to produce numerous micro jets of air. The helical flow of the water along the inner surface of the porous tube shears the micro jets of air into numerous fine bubbles. A portion of the VOCs is stripped from the water into the air. The processed water is discharged from the bottom of the tube into a collecting chamber where the water is collected to be processed through the tube again.

In the present invention, the water flowrate, air flowrate, and the size/dimension of the collecting chamber are selected such that the VOC-containing water, after having a portion of VOC removed, is recirculated within the same processing vessel before it is discharged into the next identical vessel, creating an internal recycling mode of operation. The flowrate of introduced air and the flowrate of water being pumped into the device are selected to have a ratio that is optimal for stripping removal of VOCs by the device but far less than what it is ultimately required to completely strip out the majority of VOCs from the water. VOCs are in fact stripped out step-by-step by this recycling operation from several stages of the devices. During this recycling operation a system flow of additional VOC-containing water is constantly introduced into the collecting chamber of the stripping vessel so that the same volume of the processed water is constantly flowing out of the chamber and into the next stripping vessel. The flowrate of this system flow, in terms of gallons per minutes, is less than the flowrate of the recycled flow being processed by the vessel though the processing pump during recycling operation. An optimal ratio between the system flow and the recirculated flow is also established.

The VOC-containing water, after being discharged from one stripping vessel, is then sequentially processed by further stages having the same configuration until the final discharged water has a VOC concentration suitable for its intended use. With this type of device and system design, especially for stripping MTBE from water, a separation and removal efficiency is achieved that is far superior to traditional packed tower strippers while the overall floor space as well as capital equipment and maintenance costs are significantly less than traditional packed tower strippers. The present invention also overcomes the flow problems associated with the above described horizontal tube hydrocyclone strippers.

In one embodiment, an apparatus for removing contaminants from a liquid, for instance, groundwater, according to the present invention comprises a plurality of stripping vessels for removing volatile contaminants from a liquid, each stripping vessel of the plurality of stripping vessels comprising: a porous tube having an inner surface defining an internal passageway extending substantially axially from the first end of the porous tube to the second end of the porous tube, wherein the porous tube is preferably vertically oriented along its longitudinal axis; a tangential flow director configured to feed contaminated liquid into the passageway at the first end of the porous tube in a substantially helical flow along the inner surface of the porous tube; an outer jacket at least partially surrounding an outer surface of the porous tube and having a pressurized gas inlet, the outer jacket configured to pass gas through the outer surface of the porous tube wall and into the internal passageway of the porous tube; a collecting chamber configured to receive liquid and gas from the passageway at the second end (discharge end) of the porous tube and further having an inlet to supply liquid to the collecting chamber and an outlet to remove liquid from the collecting chamber, wherein the inlet and outlet are configured to pass liquid at a first volumetric flowrate; and a recirculation pump configured to pump liquid from the collecting chamber to the tangential flow director at a second volumetric flowrate.

In a further embodiment, an apparatus for removing contaminants from a liquid such as groundwater according to the present invention comprises a supply of liquid; at least one processing stage having at least one inlet and at least one outlet configured to pass a system flow of the liquid through the at least one processing stage from the at least one inlet to the at least one outlet; a recirculation pump associated with the at least one processing stage configured to pump a recirculated flow of the liquid within the at least one processing stage at a volumetric flowrate of about 2 to 15 times a volumetric flowrate of the system flow of the liquid; a porous tube within the at least one processing stage configured to receive the recirculated flow of the liquid from the recirculation pump; and a gas inlet configured to pass a flow of gas through the wall of the porous tube at a volumetric flowrate of between about 1 to 12 times the volumetric flowrate of the recirculated flow of the liquid.

The present invention also provides a method for removing contaminants such as VOCs from a liquid such as groundwater comprising the steps of passing the liquid at a first volumetric flowrate through a plurality of stripping vessels such that the liquid passes through each stripping vessel of the plurality of stripping vessels in a serial fashion; recirculating a portion of the liquid at a second flowrate within each of the stripping vessels to produce a helical flow of liquid within each stripping vessel of the plurality of stripping vessels; and sparging a flow of gas through the helical flow of liquid within each stripping vessel of the plurality of stripping vessels to strip the contaminants from the helical flow of liquid.

In a further embodiment, the present invention provides a method for removing contaminants from a liquid, wherein the contaminants and the liquid have substantially different volatilities at any given operating temperature, comprising the steps of providing a supply of liquid; introducing a influent flow of the liquid into at least one processing stage; recirculating a portion of the liquid introduced into the at least one processing stage to provide a swirling flow of the liquid within the at least one processing stage at a flowrate of about 2 to 15 times a flowrate of the influent flow; passing a flow of gas through the swirling flow of the liquid at a flowrate between about 1 to 12 times the flowrate of the swirling flow of the liquid within the at least one processing stage; stripping contaminants from the swirling flow of liquid with the flow of gas; and removing an effluent flow of the liquid from the at least one processing stage at a flowrate equal to the flowrate of the influent flow.

Other and further features and advantages will be apparent from the following detailed description of the invention taken in conjunction with the accompanying drawings. The following examples are provided for the purposes of illustration only, and are not intended to be limiting. It will be understood by one of ordinary skill in the art that numerous combinations and modifications are possible for the embodiments presented herein.

BRIEF DESCRIPTION OF THE SEVERAL VIEWS OF THE DRAWINGS

In the drawings, which illustrate what is currently considered to be the best mode for carrying out the invention.

DETAILED DESCRIPTION OF THE INVENTION

While the following exemplary embodiments are described in terms of removing VOCs, and more specifically MTBE, from supplies of water, it should be understood that the present invention would also work well for removing other types of volatile contaminants from a broad range of carrier liquids. Further, the accompanying drawings are provided to illustrate exemplary embodiments of apparatus and methods according to the present invention. It should be understood the figures presented are not meant to be illustrative of actual views of any particular portion of a particular stripping apparatus, but are merely schematic representations which are employed to more clearly and fully depict the invention. Where possible, common elements of the illustrated embodiments are designated with like reference numerals in order to simplify the figures.

Figure 1A:
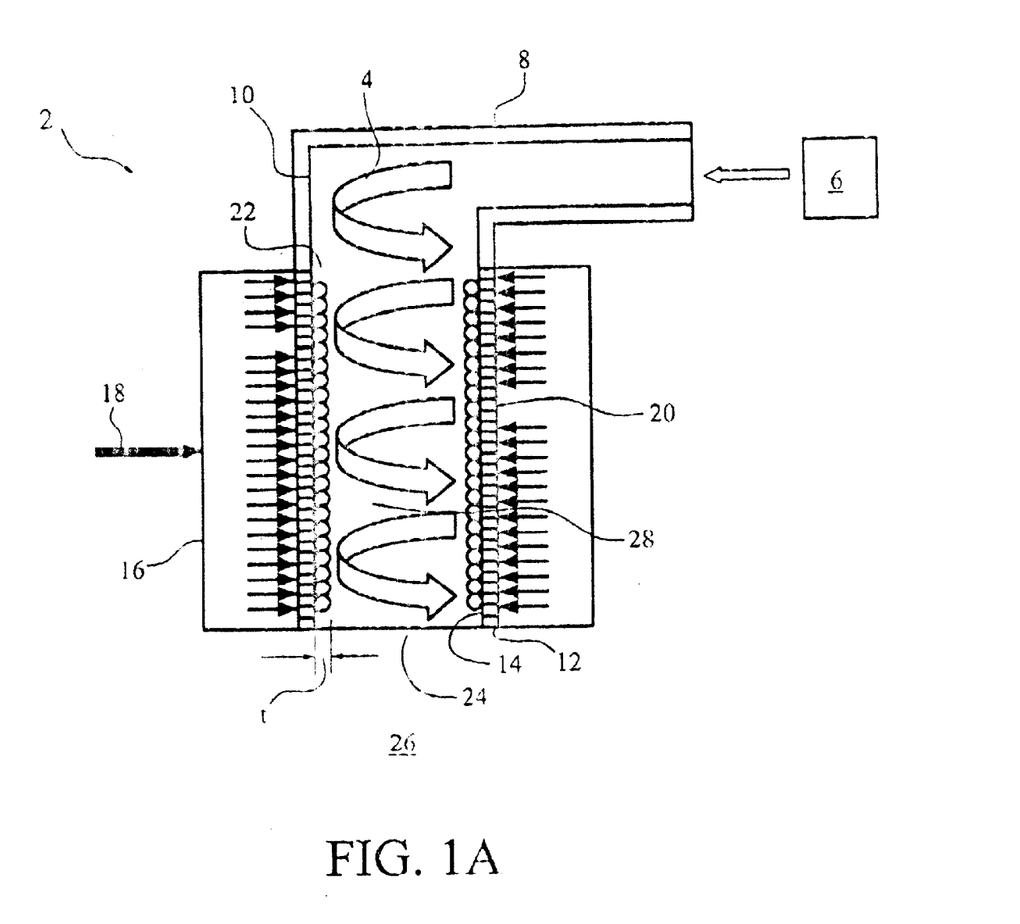
FIG. 1A is a side view of a porous tube encased within a pressurized jacketing tube for generating a helical flow of liquid in accordance with the present invention.

FIG. 1A shows the helical flow generating portion 2 of a stripping vessel 34 (FIGS. 2 and 3) according to the present invention. VOC-containing water, in particular MTBE-containing water, is pumped by a recirculation pump 6 (FIGS. 2 and 3) into a tangential flow creation component 8. The tangential flow creation component 8 is conventional and can be either purchased as an off-shelf product, such as cyclone header, or fabricated by custom machining. The water flows along the inner surface wall 10 of the tangential flow creation component 8 and enters into the inner surface wall 14 of a porous tube 12 in a helical flow pattern 4. The helical flow 4 of water has a given thickness t in the radial direction, technically referred as swirl layer thickness. This thickness t is determined and controlled by the tangential velocity of the water at the inlet of the porous tube 12. Outside the porous tube 12, there is a jacketing tube 16, serving the purpose of supplying a flow of gas to the external wall of porous tube 12.

In the following examples, the gas is described as being air. It is to be understood that other gasses such as, but not limited to, $N_2$ or air blended with $O_3$ could also be used for purposes of stripping out and deactivating residual organics, if so desired. The type of gas will depend on factors such as the nature of the carrier liquid being processed, the nature of the volatile contaminants to be removed therefrom, and the affinity of those volatiles to the specific liquid and gas compositions. The pressurized air is introduced into the porous tube 12 through an air inlet 18 mounted on the jacketing tube 16. In order to allow passage of air, porous tube 12 may be comprised, for instance, of a high density polyethylene (HDPE) material having a matrix of passages or pores of a size ranging from 5 to 100 microns at a porosity of about 0.2 to 0.8. Tubes of this type are commercially available from vendors such as Porex Corp. of Fairburn, Ga.

Figure 1B:
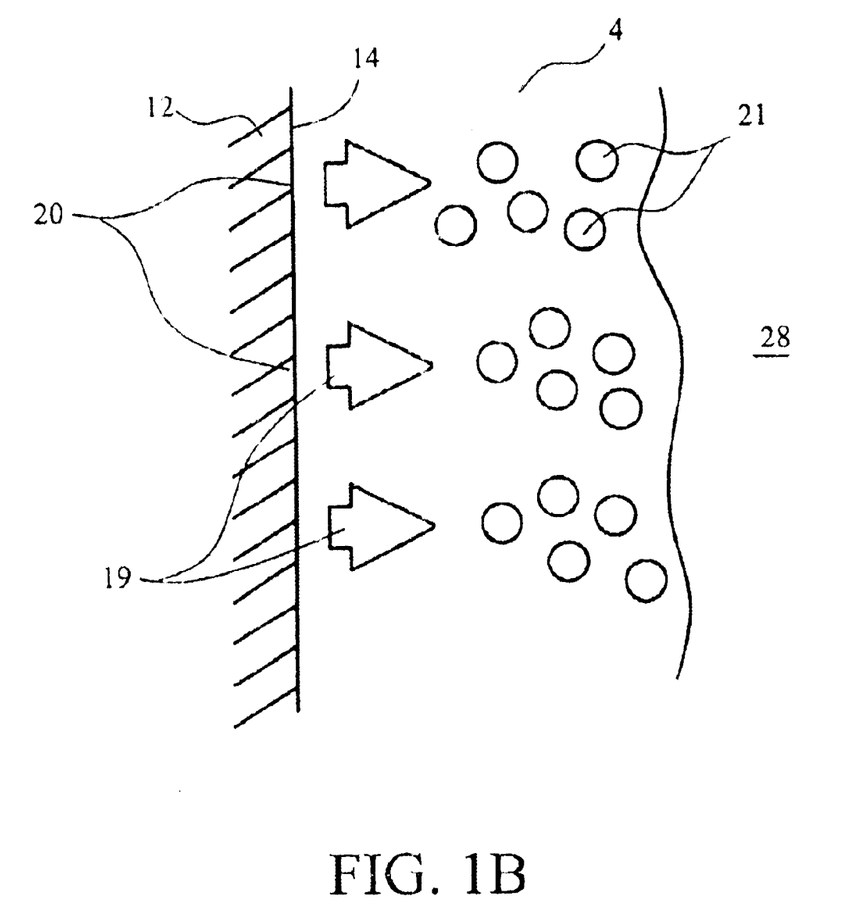
FIG. 1B is an enlarged view of a bubble/water interface existing on an inner surface wall of the porous tube depicted in FIG. 1A.

The air passes through the porous tube 12 under the pressure and is injected into the helical flow 4 of water in the form of numerous micro jets 19 emitted from pores 20 on the inner surface wall 14 of the porous tube 12. The swirl motion of the helical flow 4 of water shears these micro jets 19 into numerous fine bubbles 21 to create a significant bubble/water interface. This bubble/water interface is more clearly depicted in FIG. 1B. Due to the difference of its chemical potential between the water and the air, a VOC, such as MTBE, transfers from the water phase into the air phase (bubbles). By this process, VOCs are "stripped" from the water.

The water continuously travels from top 22 of the substantially vertically oriented porous tube 12 to the bottom 24 of the porous tube 12 during its tangential flow along the inner wall surface 14 due to the initial motion of the water and gravity. Stripping is carried out continuously over the entire length of the tube 12 until the water is discharged from the bottom 24 of the tube 12. The discharged water is collected in chamber 26 at the bottom of the stripping vessel 34, which is described in further detail below with respect to FIG. 2. During stripping, the air bubbles 21, after being loaded with the VOCs such as MTBE, leave the swirl layer "t" and travel toward the center of the tube 12, technically referred to as the air core 28. The air is discharged out from the bottom 24 of the porous tube 12 and into the collection chamber 32.

Such a device design has two significant benefits and/or advantages in VOC stripping as compared with conventional packed tower stripper. First, contrary to a conventional packed tower, the motion of the water, creation of the bubbles, and the motion of the bubbles are all controlled in forced flows. This provides the benefit of a significantly higher processing capacity of the water per unit volume of the stripping device, estimated at up to several hundreds of times higher, in terms of gallons per minute per cubic foot of the device volume. Second, numerous fine air bubbles 21 are uniformly and, most importantly, continuously formed along the inner wall surface 14 of the porous tube 12, creating a high air surface area per unit volume of the air in addition to the advantageous air/water interfacial contact, resulting in the highest stripping efficiency of VOCs from the water into the air under any given conditions.

While the above described prior horizontal tube designs provide some similar benefits over the conventional packed tower stripper, they have other shortfalls in regard to VOC stripping. As is well known in the art, many low volatile VOCs, especially MTBE, require a much higher ratio of air to water, i.e., volumetric flowrate of air required per volumetric flowrate of water processed, for effective removal. Although such a ratio is also a function of initial VOC concentration as well as the final discharge VOC concentration requirement, it is common to see a volume of air of 100 to 150 times that of the treated water volume is required for sufficient stripping of many VOCs. For MTBE, such a ratio is even greater since MTBE has a high chemical affinity with the water, or technically, a low volatile pressure. In order to deal with such low volatilities, the prior horizontal tube designs utilize ratios of sparging gas flowrate to liquid flowrate which may approach levels as high as 50 to 1. However, when the ratio of air to water reaches a certain level, estimated at above 15 to 1, adverse effects may result within the flow. First, the helical flow of the water, or the swirl motion of the water along the inner surface wall of the porous tube is disturbed, or is lost, by the higher flowrate of the micro jets of air passing out of the wall. Second, the very high velocity of the micro jets reduces the ability of the helical flow of water to sheer them into fine bubbles, resulting in the quick passage of air from the swirl layer into the center air core without time to receive volatiles. Both effects will result in a poor stripping efficiency as well as a lower processing capacity.

To overcome this dilemma, in addition to positioning the porous tube in a substantially vertical orientation, the present invention also provides a series flow recirculation method to handle this problem so that the device design can provide the necessary air flow to water flow ratios to strip low volatile VOCs without disrupting the desired rate and type of water flow or reducing stripping efficiency.

Figure 2:
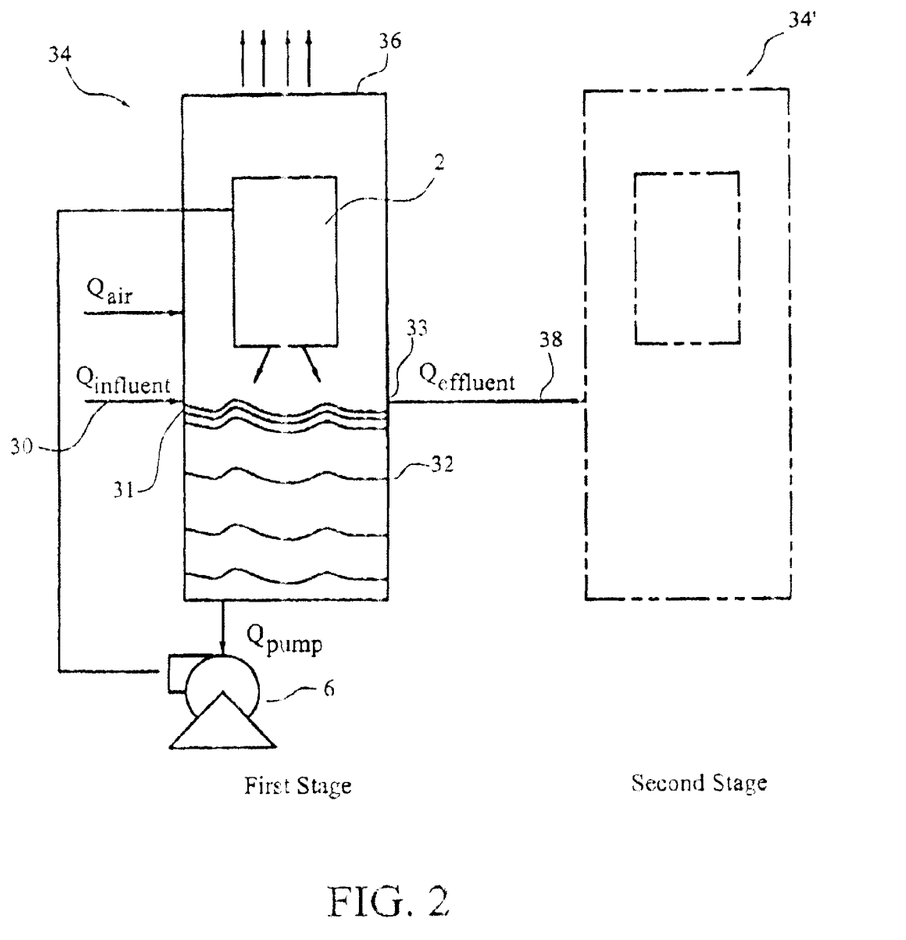
FIG. 2 is a side view of a series flow stripping vessel arrangement in accordance with the present invention.

FIG. 2 is a drawing showing the series flow staged stripping vessel arrangement of the present invention. First, a supply of raw VOC-containing water 30, (commonly referred to as an influent flow) is introduced into an inflow opening 31 of collecting chamber 32 of a first stripping vessel 34 by any means such as pumping or gravitational flow. The flowrate of the water entering into this collection chamber is designated as $Q_{influent}$. It is also actually the system processing capacity, or system flowrate, of the system in terms of gallons per minute drawn or discharged as will be described in further detail below.

After the influent flow 30 of VOC-containing water has entered into the collection chamber, it will be drawn from the bottom of the collection chamber 32 by recirculation pump 6 and fed to porous tube 12 via the aforementioned tangential flow creation part 8 near the top 36 of the stripping vessel 34 at a given flowrate, designated as $Q_{pump}$. The air is also introduced into the porous tube 12 at a given flowrate, designated as $Q_{air}$, with a preferred ratio of $Q_{air}$ to $Q_{pump}$ at a range of greater than 1 to 1 but less than 12 to 1 so that the desired tangential and swirl motion of the helical flow 4 of water is not disturbed and the VOC stripping activity of the device is conducted under optimal conditions as explained previously. After stripping of VOCs from the water, the VOC-laden air is discharged from the bottom 24 of the porous tube 12, into the collection chamber 32. The VOC laden air is then vented from the top 36 of the stripping vessel 34, carrying away the VOCs which have been stripped from the water.

Since the water, with a reduced VOC concentration after processing, is returned to the collection chamber 32, it is pumped back into the porous tube 12 to be processed again, creating an internal recycle operation allowing continuous and further reduction/removal of the VOCs.

The collection chamber 32 also has an outflow opening 33. As the flow of raw water (or influent) 30 into the collection chamber 32 is continuous, when the water level in the collection chamber 32 reaches the outflow opening 33, an effluent flow 38 of water with reduced VOC concentration will exit the collection chamber 32 at a flowrate designated as $Q_{effluent}$. Please note that under this design, the flowrate of influent 30 is the same as the effluent 38, i.e. $Q_{influent}=Q_{effluent}$. Accordingly, it can be seen this flowrate is the-system processing capacity, or system flowrate, in terms of gallons per minute drawn or discharged.

The outflow or the effluent 38 from the first stripping vessel 34 is then drawn into a second stage stripping vessel 34' that has an identical design to the first vessel 34. The flow can be either gravity flow or flow forced by a pump. Further stripping of VOCs from the water is then conducted within the second stripping vessel 34' in the same manner as conducted in the first stripping vessel 34. Once again, the porous tube in the second stage is preferably substantially vertically oriented.

Afterwards, the outflow from the second stage can be processed by a third stage, and then by a fourth stage, and so on until final effluent outflow from the stripping vessel of the final stage reaches the desired minimal VOC level. The number of stripping vessel stages will depend on the VOC concentration of the raw influent water and the target concentration desired for the final outflow.

According to the above description, it is preferred that the system processing capacity, or incoming/outflow flowrate of water by each stage in a system ($Q_{influent}$), is lower than what the internal recycling flowrate as provided by each pump of each stage in a given system ($Q_{pump}$). Based on experimentation, a ratio of between about 2 to 1 and 15 to 1 of pump volumetric flowrate or recirculated flow within each stripping vessel stage ($Q_{pump}$) to the volumetric flowrate of the system processing capacity or system flowrate ($Q_{influent}$) is preferred. That is: $Q_{pump}/Q_{influent}$ ranges from a value of 2 to 15.

Figure 3:
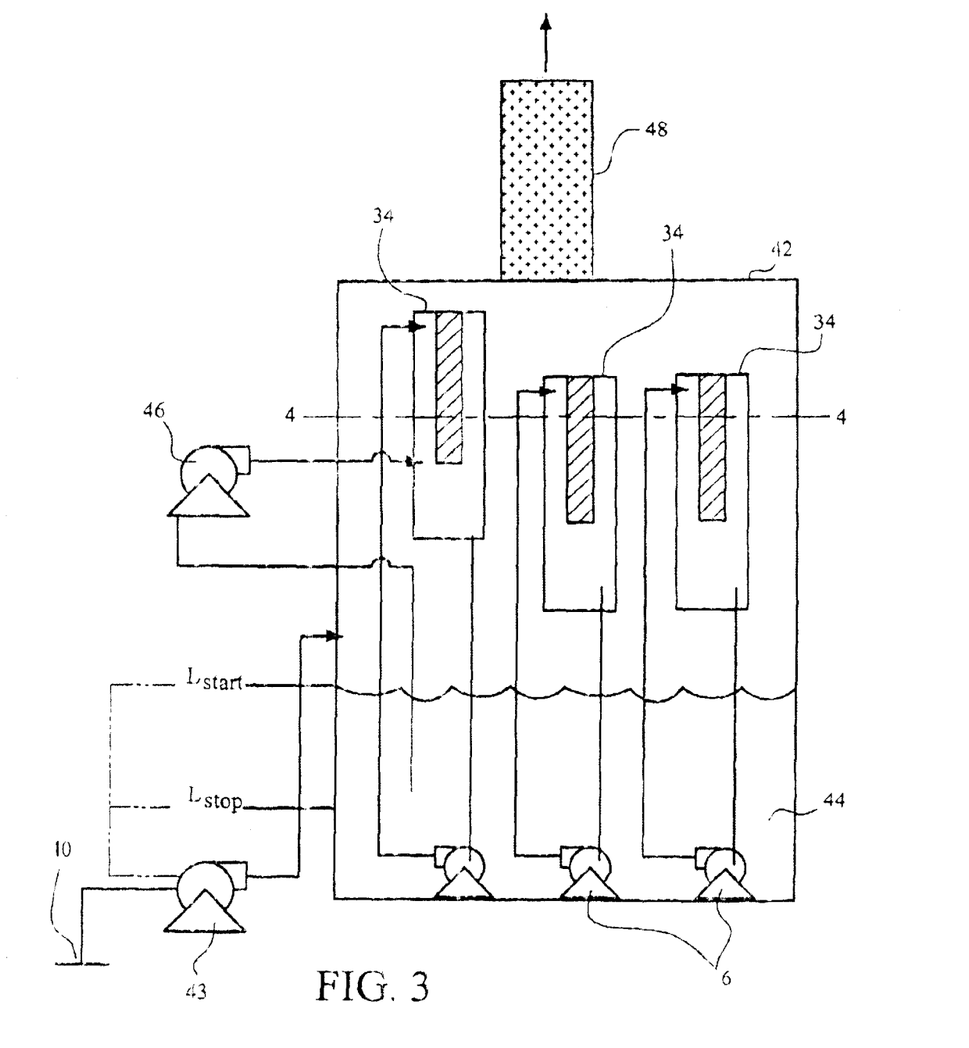
FIG. 3 is a side view of a plurality of staged stripping vessels contained within a tank in accordance with the present invention.
Figure 4:
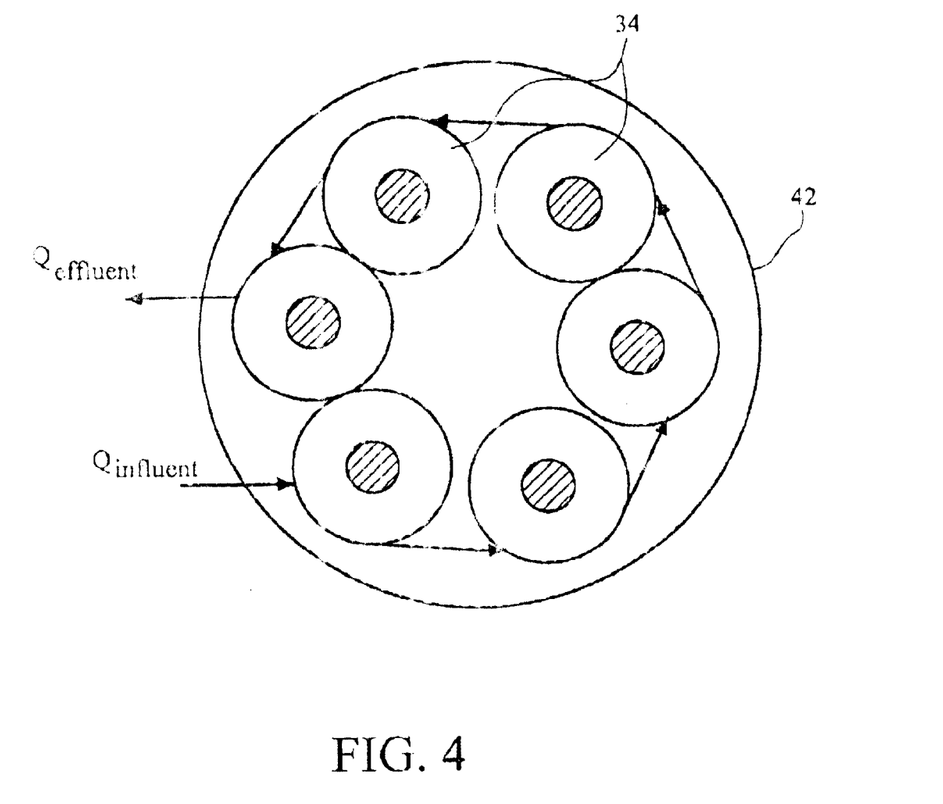
FIG. 4 is a sectional view of the stripping vessels and tank taken along line 4—4 in FIG. 3.

FIG. 3 is a drawing showing a stripping system design configuration which provides a special benefit for the processing of VOC containing water that comes from a well 40 with irregular or intermittent flow situations. The VOC-containing water is pumped into a large cylindrical tank 42 with a well pump 43. Inside the tank 42, there are multiple stripping vessel processing stages 34 mounted as schematically shown in FIG. 4. The cylindrical tank 42 serves the purposes of housing all the stage-devices 34 therein as well as providing an equalization reservoir or a buffer volume 44 of raw VOC-containing water to provide a constant flowrate for all devices in the system. Regardless of irregularity of the flowrate from the well pump 43, once the water in this cylindrical tank 42 reaches a designated level such as $L_{start}$ shown in FIG. 3, it is pumped by an influent pump 46 at a controlled/designed flowrate into the first stripping vessel collection chamber 32 and is processed in the first stage 34. The outflow of the first stage 34 enters into the second stage 34' and is processed by the second stage and so on. Once the water level inside the tank 42 reaches a low point, such as $L_{stop}$ shown in FIG. 3, all processing pumps from all stripping vessel stages will stop. In this design, even if the well pump 43 has an irregular and/or smaller flowrate than the system flowrate, the current design provides a "buffer" so that the system can continuously run at optimal capacity in VOC or MTBE removal. Also, such system design provides the smallest floor space requirement, the lowest weight in terms of equipment, as well as the ability to add additional stages if needed as shown by the drawing. Further, on top of the tank 42, a carbon canister 48 can be mounted to adsorb VOCs such as MTBE from the VOC laden air so that contamination is not released into the atmosphere. This feature will be needed in some applications, such as when the VOC or MTBE concentration in discharged the air exceeds EPA risk-based maximum contamination limits (MCL) due to high initial concentrations of VOCs in the influent flow, or if total quantity of MTBE discharged into the environment exceeds one pound per day, the maximum limit required by some states.

The following provide summaries of tests for exemplary embodiments of the present invention to better illustrate its operation and beneficial results:

Example #1

A small-scale system was built based on the present invention and tested successfully to illustrate the concept. The system consists of only three stripping vessel stages. For each stage, the inside diameter of the porous tube used was one inch, the outside diameter of the jacketing tube used was about two inches, the length of the stripping vessel used was about ten inches, which provides an L/D ratio (length to diameter ratio) of about 10 to 1. Based on preferred fluid flow characteristics, the L/D ratio should be in a range of about 5 to about 15. The diameter of the collection chamber used is about six inches.

Per this design, there are three stage pumps utilized in the system. The flowrate pumped into the porous tube of each stripping vessel by each stage pump was measured at seven liters per minute. The average ratio of the air to water ($Q_{air}/Q_{pump}$) for each stage was controlled at 6.7, i.e., $Q_{air}/Q_{pump}=6.7$. This is approximately the mid point of the preferred range of between about 2 to 1 and about 15 to 1. The influent flowrate ($Q_{influent}$), outflow flowrate ($Q_{effluent}$), or system processing capacity was controlled at 0.8 liters per minute with a ratio of pump flowrate to incoming/out flowing flowrate at 8.75 (i.e., $Q_{pump}/Q_{influent}=8.75$), somewhat also the mid point of preferred range of between about 2 to 1 and about 15 to 1.

By summing the total air flowrate from all three stages and dividing by the system processing capacity or system flowrate, the ultimate ratio of volumetric flowrate of air to volumetric flowrate of water was at about 176. That is:

$$\text{Total Air Flowrate/Processing Capacity} = \text{Stages} \times Q_{air}/Q_{pump} \times Q_{pump}/Q_{influent}$$
$$= 3 \times 6.7 \times 8.75 = 176$$

Two tests with MTBE-containing water at different concentrations were conducted. The first test was done with the water that had a low MTBE concentration while the second had a relatively high MTBE concentration, the objective being to see if the system could achieve a target that is to close to Risk-Based Preliminary Remedial Goals (PRGs) of 20 ppb (parts per billion) as published by EPA Region 9 documents. Again, both types of MTBE-containing waters were treated by identical parameters in the same three stages.

An outside analytical lab conducted analyses of MTBE with method SW846-8260B. The performance data of the system are listed in following Table 1:

TABLE 1

MTBE Removal Performance

| MTBE Concentration (ppb) | Test 1 | Test 2 |
|---|---|---|
| Incoming/Influent | 319 | 4,980 |
| Outflow/Effluent | <10 | 32 |
| Removal Efficiency (%) | >96.9 | 99.4 |

As illustrated from the data, Test #1 with 319 ppb MTBE in influent has easily achieved the PRGs. Although Test #2 with the water containing MTBE at a higher concentration of 4,980 ppb has not achieved the Risk-Based PRGs of 20 ppb, the objective can be essentially achieved if the system is modified to include a fourth stripping vessel stage.

Example #2

The second group of examples consisted of testing with MTBE-containing waters collected from two groundwater wells (sites) in California. The test procedures were identical to those used in Example #1. The analysis was conducted by the same lab with the same method. The data are given in Table 2.

TABLE 2

MTBE Removal Performance for Two Contaminated Well Waters

| MTBE Concentration (ppb) | Well #1 | Well #2 |
|---|---|---|
| Incoming/Influent | 156 | 44 |
| Outflow/Effluent | <5 | <5 |
| Removal Efficiency (%) | >96.8 | >88.6 |

It is noted that these two waters were from sites in California. In this test, the system effluents achieved levels of less than 5 ppb for both waters. This concentration is not only lower than California's primary (health) MCL of 13 ppb, but also secondary (taste) MCL of 5 ppb.

Example #3

The third example is another test with MTBE-contaminated well water, also from California. In this test, a total of six stripping vessel stages were used since it was known before the test that the water from this well had a high MTBE concentration and it was still desirable to achieve contaminant levels of less than 5 ppb in the system effluent.

Accordingly, the recirculated flowrate within each stripping vessel of this test was again controlled at seven liters per minute. The ratio of the air to water ($Q_{air}/Q_{pump}$) for each stage was controlled at eight to one, (i.e., $Q_{air}/Q_{pump}$=8:1). The influent flowrate ($Q_{influent}$), outflow flowrate ($Q_{effluent}$), or system processing capacity was controlled at 0.8 liters per minute with a ratio of pump flowrate to incoming/outflowing flowrate at 8.75 (i.e., $Q_{pump}/Q_{influent}$=8.75). Taking total air flowrate from all six stages divided by the system processing capacity or system flowrate, the ultimate ratio of the volumetric flowrate of air to the volumetric flowrate of water was 420, as calculated by the formula given in example #1. Again the analysis was conducted by the same outside lab. The test results are given in Table 3.

TABLE 3

MTBE Removal Performance from Six Stages of Operation

| MTBE Concentration (ppb) | Site #3 |
|---|---|
| Incoming/Influent | 1020 |
| Outflow/Effluent | <5 |
| Removal Efficiency (%) | >99.5 |

It should be pointed out herein that the MTBE concentration in effluent, or system discharge is not only lower than primary (health) MCL, but also secondary (taste) MCL, as adopted by the State of California. Further, although a total of six stages were used in the test, the system can still be designed and constructed into a small unit with minimal floor space requirement.

The results of the tests reported herein are for a system where the porous tubes were oriented substantially vertically to provide optimum gravity assisted helical flow. While true verticality is most preferred, a porous tube with its longitudinal axis offset somewhat from true vertical will still perform well in the system of the instant invention, and are to be considered to be encompassed within the meaning of "vertical" as the term is used herein. Porous tubes oriented at any substantial angle from horizontal will provide a system design which is superior to the horizontal tube hydrocyclones previously utilized in the art. For the purposes of this invention the porous tubes are described as being in an upright orientation, which includes tubes having their upper inlet or first ends higher than their lower discharge or second ends, and particularly to tubes oriented at plus-or-minus 45° from true verticality and preferably at less than plus-or-minus 30° from true verticality.

All of the above-illustrated embodiments and variations thereof of the present invention provide method and apparatus for removing VOCs from water that overcome the deficiencies of the prior art in terms of equipment cost and size, processing capacity and stripping efficiency. Although the present invention has been depicted and described with respect to the illustrated embodiments, various additions, deletions and modifications are contemplated within its scope. For instance, as previously discussed, the present invention would work well for removing other volatile compounds. Processing different liquids besides water could also be accomplished. The scope of the invention is, therefore, indicated by the appended claims rather than the foregoing description. Further, all changes which may fall within the meaning and range of equivalency of the claims and elements and features thereof are to be embraced within their scope.

What is claimed is:

1. A method for removing volatile contaminants from a liquid comprising:

passing a liquid at a first volumetric flowrate through a plurality of stripping stages such that the liquid passes through each stripping stage of the plurality of stripping stages in a serial fashion;

recirculating a portion of the liquid at a second flowrate within each of the stripping stages to produce a helical flow of liquid within each stripping stage of the plurality of stripping stages; and sparging a flow of gas through the helical flow of liquid within each stripping stage of the plurality of stripping stages to strip contaminants from the helical flow of liquid.

2. The method according to claim 1, wherein producing a helical flow of liquid within each stripping stage of the plurality of stripping stages comprises:

directing the recirculated portion of the liquid tangentially along a surface.

3. The method according to claim 2, wherein sparging a flow of gas through the helical flow of liquid within each stripping stage of the plurality of stripping stages comprises passing the flow of gas through the surface in the form of micro jets.

4. The method according to claim 1, further comprising venting the flow of gas from each stripping stage after stripping the contaminants from the helical flow of liquid in each stripping stage.

5. The method according to claim 1, further comprising:

enclosing the plurality of stripping stages within a tank;

containing a volume of liquid within the tank; and supplying a flow of the volume of liquid to a first stripping stage of the plurality of stripping stage for passing the liquid at the first flowrate through the plurality of stripping stages.

6. The method according to claim 5, further comprising:

sensing the level of the volume of liquid contained within the tank and controlling the first flowrate of liquid passing through the plurality of stripping stages and the second flowrate of liquid recirculated within each stripping stage in response thereto.

7. The method according to claim 5, further comprising:

venting the flow of gas after stripping the contaminants from the helical flow of liquid of each stripping stage from the tank; and filtering contaminants from the flow of gas as it is vented out of the tank.

8. The method according to claim 7, wherein filtering contaminants from the flow of gas comprises adsorbing the contaminants with carbon.

9. The method according to claim 1, wherein passing a liquid at a first flowrate through the plurality of stripping stages comprises passing a supply of water contaminated with a volatile organic compound through the plurality of stripping stages and stripping contaminants from the helical flow of liquid comprises removing the volatile organic compound.

10. The method according to claim 9, wherein removing the volatile organic compound comprises removing methyl tertbutyl ether.

11. The method according to claim 1, wherein the second flowrate of liquid recirculated within each stripping chamber is selected to be about 2 to 15 times that of the first flowrate of liquid passed through the plurality of stripping stages in a serial fashion.

12. The method according to claim 1, wherein the flow of gas passed through the surface and into the helical flow of liquid within each stripping stage is selected to have a flowrate of between about 1 to 12 times the second flowrate of liquid recirculated within each stripping stage.

13. The method according to claim 1, wherein producing a helical flow of liquid within each stripping stage of the plurality of stripping stages further comprises orienting the helical flow of liquid in a substantially vertical direction.

14. A method for removing contaminants from a liquid, comprising:

providing a supply of liquid;

introducing an influent flow of the liquid into at least one processing stage;

recirculating a portion of the liquid introduced into the at least one processing stage to provide a swirling flow of the liquid within the at least one processing stage at a flowrate of about 2 to 15 times a flowrate of the influent flow;

passing a flow of gas through the swirling flow of the liquid at a flowrate between about 1 to 12 times the flowrate of the swirling flow of the liquid within the at least one processing stage;

stripping contaminants from the swirling flow of liquid with the flow of gas; and removing an effluent flow of the liquid from the at least one processing stage at a flowrate equal to the flowrate of the influent flow.

15. The method according to claim 14, wherein recirculating a portion of the liquid introduced into the at least one processing stage to provide a swirling flow of the liquid within the at least one processing stage comprises:

pumping the portion of the liquid through a first end of a pathway contained within the at least one processing stage;

generating the swirling flow of the liquid along a surface of the pathway; and passing the swirling flow of the liquid into a collecting chamber positioned at a second end of the pathway.

16. The method according to claim 15, wherein generating the swirling flow of liquid comprises tangentially driving the liquid into the first end of the pathway of the at least one stripping stage.

17. The method according to claim 15, wherein passing a flow of gas through the swirling flow of the liquid comprises passing the flow of gas through a matrix of pores in the surface of the pathway having a size of about 50 microns or less to form micro jets.

18. The method according to claim 14, further comprising enclosing the at least one processing stage and the supply of liquid within a tank.

19. The method according to claim 18, further comprising:

pumping liquid into the tank to feed the supply of liquid within the tank;

pumping the influent flow introduced into the at least one processing stage from the supply of liquid within the tank;

monitoring a level of the supply of liquid within the tank; and controlling the flowrate of at least one of the influent flow, the swirling flow and the effluent flow in response to the level of the supply of liquid within the tank.

20. The method according to claim 18, further comprising:

venting the flow of gas from the at least one processing stage into the tank; and releasing the flow of gas from the lank.

21. The method according to claim 20, further comprising:

filtering contaminants from the flow of gas as it is released from the tank.

22. The method according to claim 21, wherein filtering contaminants from the flow of gas comprises adsorbing the contaminants in carbon.

23. The method according to claim 14, wherein providing the supply of liquid comprises providing a supply of water contaminated with a volatile organic compound and passing the flow of gas through the swirling flow and stripping contaminants from the swirling flow of liquid with the flow of gas comprises passing gas through the swirling flow and removing the volatile organic compound from the swirling flow with the gas.

24. The method according to claim 23, wherein removing the volatile organic compound comprises removing methyl tertbutyl ether.

* * * * *